United States Patent

Sousamian et al.

[11] 4,015,698
[45] Apr. 5, 1977

[54] ACTUATING MECHANISM FOR PRESSURIZED FLUID BRAKE SYSTEM AND FAIL-SAFE LOCKING DEVICE THEREFOR

[75] Inventors: William Sousamian, Hacienda Heights; John J. Filisky, Jr., Los Angeles, both of Calif.

[73] Assignee: William Sousamian, Hacienda Heights, Calif.

[22] Filed: June 16, 1975

[21] Appl. No.: 587,187

[52] U.S. Cl. .............................. 188/265; 188/152
[51] Int. Cl.² ...................................... F16D 65/32
[58] Field of Search ............. 188/79.5 K, 152, 265; 74/519, 522; 303/89

[56] References Cited

UNITED STATES PATENTS

| | | | |
|---|---|---|---|
| 2,759,569 | 8/1956 | Keehn | 188/265 X |
| 3,526,303 | 9/1970 | Lodjic et al. | 188/79.5 K X |

*Primary Examiner*—Duane A. Reger
*Attorney, Agent, or Firm*—Benoit Law Corporation

[57] ABSTRACT

A tractor trailer having an air brake system includes a reservoir of pressurized air for holding its brakes applied when parked. A fail safe locking device is provided, which is operable to lock the brake actuator rod in the fixed position in which the brakes are applied upon loss of air reservoir pressure. The locking device includes canting plates and an air cylinder. The air pressure from the reservoir overcomes a biasing mechanism in the locking device to shift the canting plates to a normal rod release position. Upon loss of pressure, the biasing mechanism shifts the air cylinder to tilt the canting plates and lock the brake actuator rod in a fixed position. The actuator rod is actuated longitudinally to rotate a brake crank arm and crank rod to apply the vehicle brakes. The crank arm interfits into a clevis extension on the actuator rod and is connected thereto by a rigid connector.

22 Claims, 8 Drawing Figures

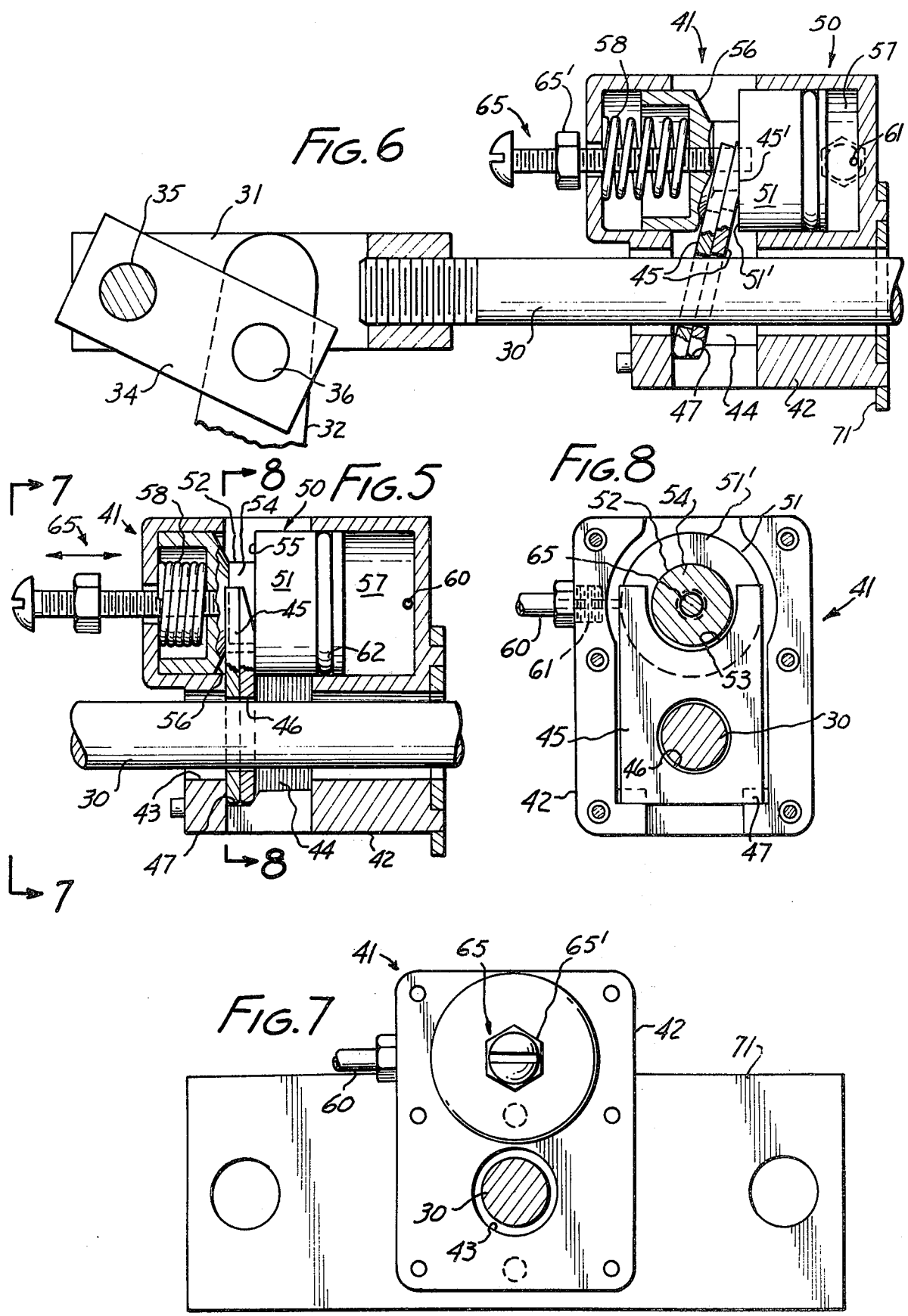

ACTUATING MECHANISM FOR PRESSURIZED FLUID BRAKE SYSTEM AND FAIL-SAFE LOCKING DEVICE THEREFOR

BACKGROUND OF THE INVENTION

The present invention relates to vehicle brake systems operated by fluid pressure, such as air, vacuum or hydraulic brake systems. Such vehicle brake systems are employed on heavy vehicles like tractor trailers and typically are operated on pressurized air.

A conventional trailer air brake system is illustrated in U.S. Pat. No. 3,482,666 issued Dec. 9, 1969 to Case et al and consists of a brake actuator rod which is actuated longitudinally by air pressure to rotate a brake crank arm and crank rod, thereby to set or apply the vehicle brakes. Generally, a tank of pressurized air is carried by the trailer which is connected in its associated brake system to provide air pressure to hold the vehicle brakes locked whenever the trailer is parked.

A serious problem inherent with using such brake systems as parking brakes is that should loss of pressure, vacuum or the like occur the vehicle brakes fail and thus release. If the trailer is parked on even a slight incline, the hazard exists that the trailer may roll away and cause serious property damage and/or personal injury. Also, if goods are being unloaded from the parked trailer or an attempt is made to couple a motor tractor and such brake failure should occur, the danger exists that the trailer may inadvertently roll or move and thereby cause an accident.

To eliminate these dangers, chocks have been used for blocking the trailer wheels. Unfortunately, chocks are susceptible to being stolen and also to being accidentally or intentionally removed, such as by children or saboteurs.

Further, as illustrated in the below-listed U.S. patents, various prior art devices have been devised in an attempt to eliminate these dangers.

| | | |
|---|---|---|
| 3,586,138 | Engle | 22 June 1971 |
| 3,482,666 | Case, et al. | 9 December 1969 |
| 3,037,819 | Sukala | 5 June 1962 |
| 2,759,569 | Keehn | 21 August 1956 |
| 1,484,475 | Crown | 19 February 1924 |
| 1,254,246 | Liedloff | 22 January 1918 |
| 710,522 | Sauvage | 7 October 1902 |

Many of these prior art locking devices employ canting rings or plates which have a hole formed therein through which is extended the brake actuator rod. With the canting ring positioned normal to the brake actuator rod, the rod is free to move longitudinally back and forth to actuate the vehicle brakes. Once, however, the canting ring is selectively tilted away from this normal position, the sides of its hole will bind upon the actuator rod and lock it in a fixed position.

Thus, it is apparent that in brake systems employing canting rings and plates as rod locking devices it is essential that the normal positioned relationship between the canting ring and actuator rod be maintained at all times except when it is desired to lock the rod in a fixed position.

Accordingly, another and related problem with prior art air brake systems of the type disclosed in U.S. Pat. No. 3,482,666 is that upon actuation of the brake actuator rod the link or other linkage mechanism conventionally used to connect the actuator rod to the brake crank arm tends to force the actuator rod away from its longitudinal path of movement. This has two distinct disadvantages. Firstly, the link is continuously subjected to forces which may ultimately cause it to break. Secondly, if a locking device incorporating a canting ring is associated with the brake actuator rod, the actuator rod may be forced out of the normal positional relationship with the canting ring and undesirably lock up by binding therewith. Further, with trailers and like vehicles it has been found difficult to construct guide structure for restraining movement of the brake actuator rod to its selected longitudinal path of travel since such structure would have to be mounted on the wheel axle. The wheel axle of a trailer is an unsuitable location for mounting such guide structure since the axles are generally mounted on springs and thus subjected to torsional and other forces during rolling movement of the trailer.

SUMMARY OF THE INVENTION

It is accordingly an object of the present invention to provide an improved actuating mechanism and fail-safe locking device therefor characterized by being suitable for use on tractor trailer type vehicles and the like, in a fluid pressure operated brake system, which obviates the aforementioned disadvantages of the prior art.

It is further an object of the present invention to provide improved mechanism for connecting the actuator rod of an air brake system of the type shown in U.S. Pat. No. 3,482,666 with the brake crank arm thereof which is characterized by operating to exert forces on the actuator rod which tend to straighten the rod and hold it in alignment with its selected longitudinal path of reciprocal movement.

In accomplishing these and other objects, there is provided a tractor trailer having an associated air brake system. The air brake system is of the basic type described in U.S. Pat. No. 3,482,666 and has a brake actuator rod which is actuated longitudinally to rotate a brake crank arm and crank rod, thereby to set or apply the vehicle brakes.

The crank arm interfits into a clevis extension on the actuator rod and is connected thereto by a rigid connector. The rigid connector is pivotally connected at one end to the crank arm and at its other end to the outer end of the clevis extension. This connecting mechanism inherently operates to exert forces on the actuator rod which tend to straighten and hold the rod in alignment with its longitudinal path of movement.

Included in the air brake system is a pressurized air reservoir, commonly called an emergency tank, which functions to hold the trailer brakes applied when the trailer is parked. Associated with the air reservoir is a fail safe locking device operable to lock the brake actuator rod in the fixed position in which the brakes are applied upon loss of pressure of the air reservoir. The locking device includes canting plates and an air cylinder. The cylinder operates to hold the canting plates in a normal rod release position when pressurized by air from the air reservoir, i.e. when sensing this selected condition. Upon loss of the air pressure level, biasing mechanism shifts the air cylinder to tilt the canting plates from the normal release position to lock the brake actuator rod in a fixed position.

Additional objects of the present invention reside in the specific construction of the exemplary embodiment thereof hereinafter described in conjunction with the several drawings.

BRIEF DESCRIPTION OF THE DRAWINGS

The invention and its objects will become more readily apparent from the following detailed description of preferred embodiments thereof, illustrated by way of example in the accompanying drawings, in which:

FIG. 5 is a sectional view through the locking device of the preferred embodiment of FIG. 4, actuated in its rod release position;

FIG. 6 is a partially sectional view similar to FIG. 5, illustrating the locking device actuated in its rod locking position;

FIG. 7 is a view taken along the line 7 — 7 of FIG. 5; and

FIG. 8 is a view taken along the line 8 — 8 of FIG. 5.

DETAILED DESCRIPTION OF THE PREFERRED EMBODIMENT

Figure 1:
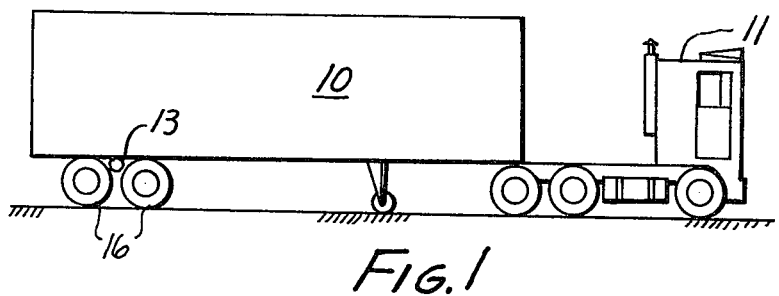
FIG. 1 is a side elevation view of a trailer carrying brake actuating mechanism and a fail-safe locking device according to a preferred embodiment of the present invention, the trailer being illustrated coupled with a motor tractor.

Referring to the drawings in more detail, there is shown in FIG. 1 a tractor trailer vehicle 10 coupled in a conventional manner with a motor tractor 11.

Figure 2:
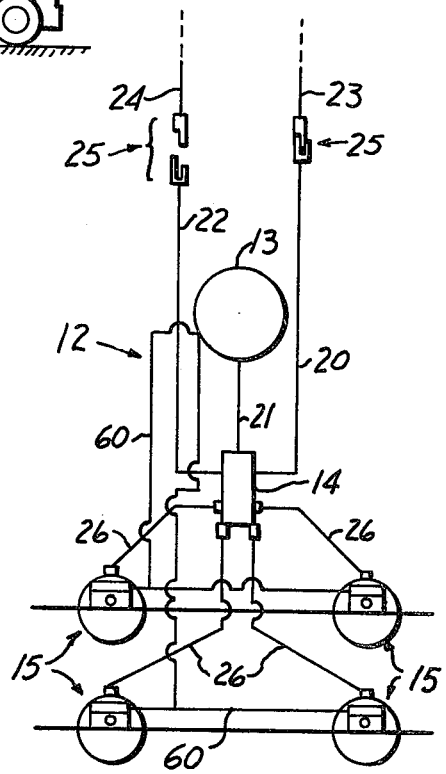
FIG. 2 is a diagram of the air brake system of the tractor - trailer vehicle of FIG. 1.
Figure 4:
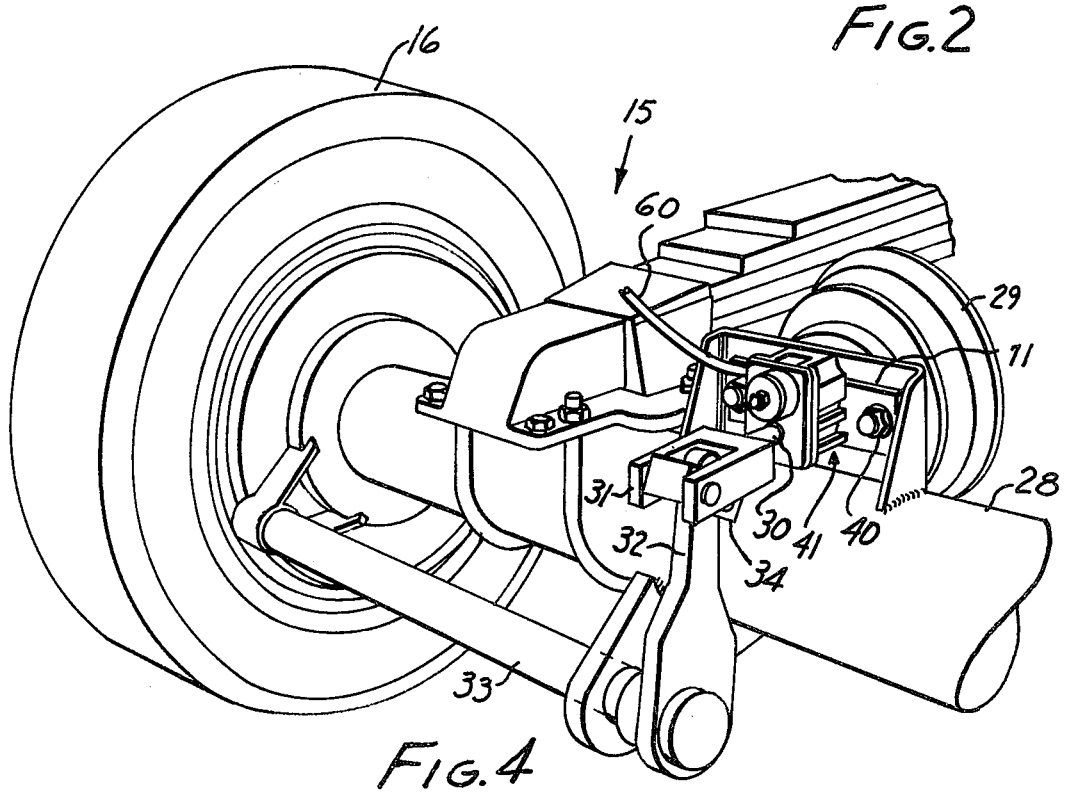
FIG. 4 is a perspective view of one of the trailer wheels along with the brake actuating mechanism and fail-safe locking device according to the illustrated preferred embodiment of the invention.

The air brake system 12 carried by and mounted on the trailer 10 is shown diagrammatically in FIG. 2. The air brake system 12 has a source of pressurized air 13, commonly called an emergency tank, a control valve 14 and brake mechanism 15 associated with each of the trailer wheels 16.

The control valve 14 is of conventional design, may be selectively cycled in a conventional manner, and is connected to receive pressurized air through air lines or hoses 20 and 22. Coupling mechanisms 25 permit the air lines 20 and 22 to be coupled, respectively, to a service line 23 and to a hot line 24 of the tractor 11. The service line 23, in a conventional manner, is connected to a brake pedal (not shown) located in the tractor 11 and varying the air pressure in the lines 20 and 23 as desired by the driver for controlling application and release of the brakes during normal operation of the vehicle. The hot line, in a conventional manner, is connected to an air tank (not shown) in the tractor 11.

In operation of the brake system 12, when the tractor 11 is connected thereto and coupled to the trailer 10 as shown in FIG. 1, the air brakes 15 are applied by operating a control in the tractor 11, i.e. the tractor brake pedal, thereby to shift the valve 14 so that pressurized air from the service line 23 is delivered through air lines 20 and 26 to each of the air brakes 15. If air pressure is lost in the line 22 for any reason, the operator of the tractor 11 may operate a conventional control on the tractor control panel (not shown) to switch the operation of the brake system from regular service to emergency service. The brake system then functions in the same manner except that the valve 14 isolates and actuates the brakes by now channeling pressurized air from the tank 13 and a line 21 to the air brakes 15, instead of from the air line 20.

Figure 3:
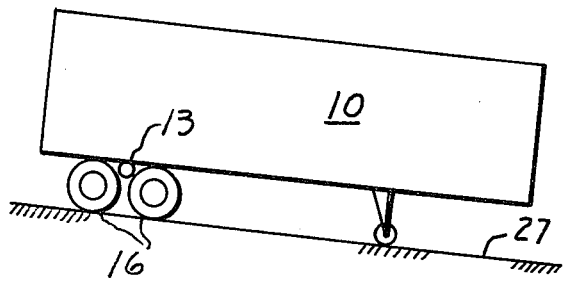
FIG. 3 is a side elevation view of the trailer in FIG. 1 illustrated parked and uncoupled from the tractor.

FIG. 3 illustrates the trailer 10 parked on an inclined surface 27. The trailer 10 is parked by moving it into place on the surface 27 by means of the tractor 11. Once the trailer 10 is in place, a conventional control is operated on the tractor control panel to shift the valve 14 so that pressurized air from the tank 13 is delivered through the valve 14 to the lines 26. Thereby, the air pressure of the tank 13 is applied to actuate the brakes 15 to brake each of the trailer wheels 16 for parking the trailer 10.

It is noted to set the air brakes 15 firmly for parking the trailer 10 that it is preferable to first apply the brakes by actuating the tractor brake pedal and then, with the brakes 15 already applied, shift the valve 14 to the air tank 13. Once the valve 14 is shifted so that the air brakes 15 are held applied by the air pressure of the tank 13, the tractor 11 may be uncoupled from the trailer 10.

Referring to FIGS. 4–8, one of the air brakes 15 is there shown. The pressurized air delivery line 26 is connected to an air actuated diaphragm 29. The diaphragm 29 is fixedly mounted on the vehicle axle 28. The air diaphragm 29 is connected to one end of a brake actuator rod 30, the end of the rod 30 being fixedly secured to the diaphragm 29 to extend therefrom in a substantially horizontal disposition. The actuator rod 30 has a clevis 31 formed as a longitudinal extension on its other end, the longitudinal axes of the clevis 31 and rod 30 being aligned. A brake crank arm 32 is mounted in a manner similar to that shown in U.S. Pat. No. 3,482,666 on a brake crank rod 33, to extend vertically upwardly therefrom to interfit within the clevis 31. A rigid connector 34, illustrated formed in the shape of a clevis, is positioned within the clevis 31.

The rigid connector 34 is pivotally connected along a first pivot axis at its open clevis end to the upper portion of the crank arm 32 and at its other closed end along a second pivot axis to the outer open end of the clevis extension 31. Pins 35, 36 are illustrated employed for pivotally connecting the rigid connector 34 to the clevis 31 and crank arm 32, respectively. It is noted that the axes about which the ends of the connecting member 34 pivot are mutually parallel and substantially perpendicular to both the longitudinal axis of the upper portion of the crank arm 32 and the longitudinal axis of the actuator rod 30. Also, the close fit of the connector 34 in the clevis extension 31 and of the crank arm 32 in the clevis shape of the connector 34 operates to hold the crank arm 32, and thus rod 30, against lateral movement.

In operation of the air brake mechanism above-described, pressurized air delivered through the line 26 drives the air diaphragm 29 to advance the rod 30 longitudinally along the longitudinal path of travel defined by its length. Advancement of the rod 30 rotates the brake crank arm 32 and the crank rod 33, thereby to apply the vehicle brakes and brake the illustrated wheel 16. Rotation of the crank rod 33 actuates brake bands (not shown) or another conventional braking device located in the vehicle wheel 16. It is noted that the crank rod 33 extends perpendicularly to the rod 30 and that the crank arm 32 extends radially therefrom.

It is noted that the connecting mechanism provided by the clevis extension 31 and the rigid connector 34 inherently operates to exert forces on the actuator rod 30 which tend to straighten it, and hence which tend to hold the rod 30 in alignment with its longitudinal path of travel. The reason for this fact is that when the rod 30 is advanced to apply the brakes the rotation of the crank arm 32 is toward the connector 34 and the clevis 31, with the result that a force is applied through the connector 34 which tends to push the clevis 31 in the direction it is being advanced. Thus, this force tends to hold the rod 30 straight.

Bolted by bolts 40 on the side of the air diaphragm 29 to which rod 30 is connected is a fail-safe rod locking device 41. The device 41 is formed by a housing 42. The housing 42 has a horizontal bore 43 formed through its lower positioned portion through which extends the rod 30. A cavity 44 is formed in the end of the housing 42 remote from the diaphragm 29. The cavity 44 is dimensioned to hold a stack of canting plates 45, such as two as shown. The canting plates 45 have aligned holes 46 formed therethrough through which the rod 30 extends and operate when tilted away from a normal, i.e. perpendicular, position with regard to the rod 30 to lock the rod 30 in a fixed position. The bottom edges of the canting plates are held against displacement by being positioned in a notch 47 formed as the lower portion of the cavity 44.

An air cylinder 50 forms the upper portion of the housing 42. The cylinder 50 has a piston 51 which is mounted for reciprocal longitudinal movement along a path of travel parallel to the path of travel of the rod 30. The piston 51 has an annular groove 52 formed therein for receiving the canting plates 45. The canting plates 45 have a U-shaped opening 53 formed in their upper edges for fitting around the cylindrical piston portion 54 defining the bottom of the groove 52. The side 55 of the groove 52 adjacent the diaphragm 29 is a surface perpendicular to the axis of the piston 51 while the facing groove surface 56 is slanted outwardly from the cylindrical piston portion 54. A cylindrical air cavity 57 is formed in the housing 42 adjacent the end of the piston 51 adjacent the diaphragm 29 and a biasing mechanism in the form of a compression spring 58 is positioned within the housing 42 to push against the other end of the piston 51.

As shown in FIG. 2, pressurized air from the air tank 13 is supplied to the air cavity 57 by air lines 60. The pressurized air flows from the line 60 through the hole 61 in the housing 42 into the cavity 57. As shown in FIGS. 5 and 6, an O-ring seal 62 is formed around the end of the piston 51 which fits within the cylindrical cavity 57 to provide an airtight seal.

In operation of the locking device 41, air pressure from the air tank 13 fills the cavity 57 and overcomes the biasing force of the compression spring 58 to shift the device 41 to the rod release position shown in FIG. 5. In this position, the piston 51 is extended and holds the canting plates 45 in a substantially vertical position normal to the brake actuating rod 30. With the canting plates 45 positioned normal to the rod 30, the rod 30 is free to move through the holes 46 therein, as may be seen from FIG. 5.

Upon loss of pressure in the tank 13, the locking device 41 operates in the following manner to lock the brake rod 30 in place. Loss of air pressure occurs in the cavity 57 with the result that the compression spring 58 forces the piston 51 into the cavity 57 to the position shown in FIG. 6. Thereby, the canting plates 45 are tilted from a position normal to the rod 30. Hence, the sides of the holes 46 in the canting plates 45 bind against the rod 30 to lock it in a fixed position. Thus, if air pressure leaks from or is lost in the tank 13 when the trailer 10 is parked as shown in FIG. 3, the fail-safe locking device 41 will automatically operate to lock the brake actuator rods 30 in place to prevent the trailer 10 from rolling away. It is noted that the upper edge 45' of the locking plate 45 contacting the piston 51 at its annular flat rear surface 51' is preferably chamfered or beveled. In this manner, the plates 45 lock the actuator rods 30 rapidly in response to a moderate travel of the pistons 51. To permit movement of the trailer when no air is available, the locking device 41 includes a manual release in the form of a screw mechanism 65 having a nut 65' which may be rotated to pull the piston 51 and locking plates 45 to the unlocked position of FIG. 5.

Once the locking device 41 has been actuated to its rod locking position, it may be reset to the rod release position by re-pressurizing the tank 13. If the canting plates 45 are locked on the rod 30, this lock may be broken with the tractor 11 hooked up to the trailer 10 by simply applying the tractor brakes.

It is noted that the linking mechanism provided by the clevis extension 31 and the rigid connector 34, due to the straightening forces applied thereby to the rod 30, essentially eliminates the danger of the rod 30 inadvertently being tilted relative to the canting plates 45 and binding therewith. A mounting plate 71 facilitates the mounting of the device 41 near the diaphragm 29.

Although the invention is herein shown and described in what is conceived to be the most practical and preferred embodiment, it is recognized that departures may be made therefrom within the scope thereof.

What is claimed is:

1. In a fluid pressure operated brake system where a brake actuator rod is selectively movable along a straight line path of travel corresponding to its longitudinal axis to actuate a brake crank arm disposed adjacent a first end of said actuator rod, the improvement of mechanism for connecting said first rod end to said crank arm comprising:

a clevis having an open and closed end, said clevis forming a longitudinal extension of the first end of said actuator rod with said open clevis end positioned outwardly, said crank arm being positioned to interfit within said clevis; and a rigid connecting member for connecting said clevis to said crank arm, one end of said conecting member being connected to said crank arm to pivot about a first axis, the other end of said connecting member being connected to the outer open end of said clevis to pivot about a second axis whereby said connecting member is disposed to extend from said crank arm outwardly from the closed end of said clevis towards its open end.

2. In a fluid pressure operated brake system where a brake actuator rod is selectively movable along a straight line path of travel corresponding to its longitudinal axis to actuate a brake crank arm disposed adjacent a first end of said actuator rod, the improvement of mechanism for connecting said first rod end to said crank arm comprising:

a clevis having an open and closed end, said clevis forming a longitudinal extension of the first end of said actuator rod with said open clevis end positioned outwardly, said crank arm being positioned to interfit within said clevis; and a rigid connecting member for connecting said clevis to said crank arm, one end of said connecting member being connected to said crank arm to pivot about a first axis, the other end of said connecting member being connected to the outer open end of said clevis to pivot about a second axis whereby said connecting member is disposed to extend from said crank arm outwardly from the closed end of said clevis towards its open end, with said first and second pivot axes being substantially mutually parallel, and said connecting member interfitting within said clevis.

3. The invention defined in claim 2, wherein said first and second pivot axes are substantially perpendicularly disposed with respect to the longitudinal axis of said actuator rod 4. The invention defined in claim 3, wherein the longitudinal axis of the portion of said crank arm to which said connecting member is pivotally connected is substantially perpendicularly disposed to said first pivot axis.

5. The invention defined in claim 4, in combination with said fluid pressure operated brake system; and wherein said brake system includes a rotatably mounted crank rod for actuating vehicle brakes, said crank arm being fixedly secured to said crank rod to extend radially therefrom whereby actuation of said crank arm rotates said crank rod, said crank rod being disposed with its longitudinal axis substantially perpendicular to the longitudinal axis of said actuator rod.

6. The invention defined in claim 1, wherein the longitudinal axis of said clevis is substantially aligned with the longitudinal axis of said actuator rod.

7. In a fluid pressure operated brake system where a brake actuator rod is selectively movable along a straight line path of travel corresponding to its longitudinal axis to actuate a brake crank arm disposed adjacent a first end of said actuator rod, the improvement of mechanism for connecting said first rod end to said crank arm comprising:
   a clevis having an open and closed end, said clevis forming a longitudinal extension of the first end of said actuator rod with said open clevis end positioned outwardly, said crank arm being positioned to interfit within said clevis; and
   a rigid connecting member for connecting said clevis to said crank arm, one end of said connecting member being connected to said crank arm to pivot about a first axis, the other end of said connecting member being connected to the outer open end of said clevis to pivot about a second axis whereby said connecting member is disposed to extend from said crank arm outwardly from the closed end of said clevis towards its open end, with said connecting member being a second clevis having an open and closed end, said second clevis being smaller than said first clevis and dimensioned to fit therein, said second clevis having its closed end pivotally mounted in the open end of said first clevis, said crank arm interfitting within the open end of said second clevis and being pivotally mounted therein.

8. The invention defined in claim 1, in combination with said fluid pressure operated brake system, said brake system including:
   means for supplying fluid pressure;
   means connected to receive said fluid pressure to actuate said actuator rod in response thereto to apply the brakes associated with said brake system; and
   means connected to receive said fluid pressure and responsive to the loss thereof for locking said actuator rod in a fixed position.

9. The invention defined in claim 8, wherein said rod locking means includes:
   at least one canting plate associated with said actuator rod, said actuator rod being freely positionable with respect to said canting plate when said canting plate is positioned normal thereto and binding with said canting plate to be locked in a fixed position when said canting plate is tilted from said normal position; and
   means responsive to said fluid pressure and the loss thereof for positioning said canting plate in a substantially normal disposition to said actuator rod in response to said fluid pressure and for tilting said canting plate from said normal position upon loss of said fluid pressure.

10. The invention defined in claim 9, wherein:
    said brake actuating system is associated with a tractor trailer;
    said fluid pressure supply means is a source of pressurized air associated with said trailer for holding the trailer brakes applied when the trailer is parked; and
    said canting plate positioning means is an air cylinder having means for biasing said canting plate in said tilted position when said source of pressurized air loses pressure.

11. Actuator mechanism, comprising:
    a straight actuator rod;
    means mounting said actuator rod for selective movement along a straight line path of travel corresponding to its longitudinal axis;
    a clevis having an open and closed end, said clevis forming a longitudinal extension of one end of said actuator rod with said open clevis end positioned outwardly;
    a crank rod;
    means mounting said crank rod for selective rotation;
    a crank arm fixedly secured to said crank rod to extend radially therefrom, said crank arm being positioned to interfit within said clevis; and
    a rigid connecting member for connecting said clevis to said crank arm, one end of said connecting member being connected to said crank arm to pivot about a first axis, the other end of said connecting member being connected to the outer open end of said clevis to pivot about a second axis whereby said connecting member is disposed to extend from said crank arm outwardly from the closed end of said clevis towards its open end.

12. Actuator mechanism, comprising:
    a straight actuator rod;
    means mounting said actuator rod for selective movement along a straight line path of travel corresponding to its longitudinal axis;
    a clevis having an open and closed end, said clevis forming a longitudinal extension of one end of said actuator rod with said open clevis end positioned outwardly;
    a crank rod;
    means mounting said crank rod for selective rotation;
    a crank arm fixedly secured to said crank rod to extend radially therefrom, said crank arm being positioned to interfit within said clevis; and
    a rigid connecting member for connecting said clevis to said crank arm, one end of said connecting member being connected to said crank arm to pivot about a first axis, the other end of said connecting member being connected to the outer open end of said clevis to pivot about a second axis whereby said connecting member is disposed to extend from said crank arm outwardly from the closed end of said clevis toward its open end; with said first and second pivot axes being substantially mutually parallel and substantially perpendicularly disposed with respect to the longitudinal axis of said actuator rod;

said crank rod being disposed with its longitudinal axis substantially perpendicular to the longitudinal axis of said actuator rod;

the longitudinal axis of the portion of said crank arm to which said connecting member is pivotally connected being substantially perpendicularly disposed to said first pivot axis; and said connecting member interfitting within said clevis.

13. The invention defined in claim 12, wherein said connecting member is a second clevis having an open and closed end, said second clevis being smaller than said first clevis and dimensioned to fit therein, said second clevis having its closed end pivotally mounted in the open end of said first clevis, said crank arm interfitting within the open end of said second clevis and being pivotally mounted therein.

14. The invention defined in claim 13, wherein the longitudinal axes of said first clevis and actuator rod are substantially aligned.

15. The invention defined in claim 13 in combination with means responsive to a selected condition for locking said actuator rod in a fixed position.

16. The invention defined in claim 15, wherein:
said selected condition is fluid pressure level; and
said rod locking means includes canting plates for locking said actuator rod in a fixed position and means in the form of a pressure operated cylinder for positioning said canting plates as a function of said fluid pressure level.

17. The invention defined in claim 2, wherein the longitudinal axis of said clevis is substantially aligned with the longitudinal axis of said actuator rod.

18. The invention defined in claim 2, in combination with said fluid pressure operated brake system, said brake system including:
means for supplying fluid pressure;
means connected to receive said fluid pressure to actuate said actuator rod in response thereto to apply the brakes associated with said brake system; and
means connected to receive said fluid pressure and responsive to the loss thereof for locking said actuator rod in a fixed position.

19. The invention defined in claim 18, wherein said rod locking means includes:
at least one canting plate associated with said actuator rod, said actuator rod being freely positionable with respect to said canting plate when said canting plate is positioned normal thereto and binding with said canting plate to be locked in a fixed position when said canting plate is tilted from said normal position; and
means responsive to said fluid pressure and the loss thereof for positioning said canting plate in a substantially normal disposition to said actuator rod in response to said fluid pressure and for tilting said canting plate from said normal position upon loss of said fluid pressure.

20. The invention defined in claim 19, wherein:
said brake actuating system is associated with a tractor trailer;
said fluid pressure supply means is a source of pressurized air associated with said trailer for holding the trailer brakes applied when the trailer is parked; and
said canting plate positioning means is an air cylinder having means for biasing said canting plate in said tilted position when said source of pressurized air loses pressure.

21. In a fluid pressure operated brake system where a brake actuator rod is selectively movable along a straight line path of travel corresponding to its longitudinal axis to actuate a brake crank arm disposed adjacent a first end of said actuator rod, the improvement of mechanism for connecting said first rod end to said crank arm comprising:
a first clevis having an open and closed end, said first clevis forming a longitudinal extension of the first end of said actuator rod with said open clevis end positioned outwardly, said crank arm being positioned to interfit within said first clevis; and
a second clevis positioned within said first clevis for connecting said first clevis to said crank arm, one end of said second clevis being connected to said crank arm to pivot about a first axis, the other end of said second clevis being connected to the open end of said first clevis to pivot about a second axis whereby said second clevis is disposed to extend from said crank arm outwardly from the closed end of said first clevis towards its open end.

22. Actuator mechanism, comprising:
a straight actuator rod;
means mounting said actuator rod for selective movement along a straight line path of travel corresponding to its longitudinal axis;
a first clevis having an open and closed end, said first clevis forming a longitudinal extension of one end of said actuator rod with said open clevis end positioned outwardly;
a crank rod;
means mounting said crank rod for selective rotation;
a crank arm fixedly secured to said crank rod to extend radially therefrom, said crank arm being positioned to interfit within said first clevis; and
a second clevis positioned within said first clevis for connecting said first clevis to said crank arm, one end of said second clevis being connected to said crank arm to pivot about a first axis, the other end of said second clevis being connected to the open end of said first clevis to pivot about a second axis whereby said second clevis is disposed to extend from said crank arm outwardly from the closed end of said first clevis towards its open end.

* * * * *